United States Patent
Uematsu et al.

(10) Patent No.: US 6,568,763 B2
(45) Date of Patent: May 27, 2003

(54) SYSTEM FOR CONTROLLING OPERATION OF CYLINDER OF VEHICLE

(75) Inventors: Koji Uematsu, Oyama (JP); Seiichi Abe, Oyama (JP)

(73) Assignee: Komatsu Ltd., Tokyo (JP)

( * ) Notice: Subject to any disclaimer, the term of this patent is extended or adjusted under 35 U.S.C. 154(b) by 18 days.

(21) Appl. No.: 09/948,340

(22) Filed: Sep. 7, 2001

(65) Prior Publication Data

US 2002/0047300 A1 Apr. 25, 2002

(30) Foreign Application Priority Data

Sep. 12, 2000 (JP) .......................... 2000-275978

(51) Int. Cl.⁷ .................................................. B60P 1/16
(52) U.S. Cl. ........................ 298/22 C; 298/7; 298/22 R; 298/22 P
(58) Field of Search ............................. 298/22 R, 22 C, 298/22 P, 7; 180/271, 272

(56) References Cited

U.S. PATENT DOCUMENTS

| | | | | |
|---|---|---|---|---|
| 4,382,632 A | * | 5/1983 | Pitts ........................... | 298/17.5 |
| 4,865,389 A | * | 9/1989 | Martin ....................... | 298/22 C |
| 5,020,857 A | * | 6/1991 | Bertelson .................. | 298/22 R |
| 5,141,288 A | * | 8/1992 | Smith ......................... | 298/17.6 |
| 5,452,942 A | * | 9/1995 | Brooks ...................... | 298/22 C |

FOREIGN PATENT DOCUMENTS

| | | |
|---|---|---|
| JP | 1-00330 A | 1/1989 |
| JP | 1-234603 A | 9/1989 |
| JP | 9-119405 A | 5/1997 |
| JP | 11-270505 A | 10/1999 |
| JP | 2000-87916 A | 3/2000 |

* cited by examiner

Primary Examiner—Stephen T. Gordon
(74) Attorney, Agent, or Firm—Frishauf, Holtz, Goodman & Chick, P.C.

(57) ABSTRACT

A system for controlling an operation of a cylinder comprises: a hoist cylinder displacing a member to be driven such as vessel of a dump truck in a vertical direction; a directional control valve for switching the cylinder so as to take a first position performing an expansion motion of the hoist cylinder and a second position performing a contraction motion thereof; an electromagnetic proportional pressure control valve for throttling a meter-out area at a time when the directional control valve takes the second position; a potentiometer for outputting a signal in response to the vertical displacement of the vessel; and a controller. When the controller detects that the vessel is just before the descending end position, the controller controls to reduce the output pressure as optimum current from the electromagnetic proportional pressure control valve to thereby make slow the descending speed by throttling the meter-out area of a hoist valve of the hoist cylinder. Thereafter, the vessel descending speed is detected by the controller, and in the case where this descending speed differs from the set descending speed, the current from the electromagnetic proportional pressure control valve is amended to thereby amend the descending speed through the control of the meter-out area of the hoist valve.

4 Claims, 3 Drawing Sheets

SYSTEM FOR CONTROLLING OPERATION OF CYLINDER OF VEHICLE

BACKGROUND OF THE INVENTION

The present invention relates to a system for controlling an expansion/contraction operation of a cylinder for vertically moving a driven member, such as a hoist cylinder of a vehicle particularly for vertically swinging a vessel of a dump truck or an arm cylinder for vertically swinging an arm of an excavation loader.

In the dump truck, a hoist cylinder is arranged between a vehicle body (truck body) and a vessel so that the vessel is swung upward through the expansion motion of the hoist cylinder to take a standing state and swung downward through the contraction motion of the hoist cylinder to take a tilt-down state in which the vessel is settled on the vehicle body.

In such dump truck, when the contraction motion of the hoist cylinder is made fast, the vessel is swung downward in an increased speed so that the vessel in the standing state can be tilted i.e., descending, down in a short time. However, if the vessel is swung downward rapidly, the vessel is seated or settled on the vehicle body with a large shock (called, seating shock, hereinlater).

Contrary to the above, when the contraction motion of the hoist cylinder is made slow, the seating shock is reduced. However, it takes much time for the vessel now in the standing state to take its tilt-down position.

In the prior art, in order to obviate such defects as mentioned above, there have been proposed various techniques for reducing the seating shock by making slow the contraction speed of the hoist cylinder just before the seating (settling) on the vehicle body, i.e., stroke-end time.

For example, in a device disclosed in Japanese Patent Laid-open Publication No. HEI 9-119405, at a time when the movement of the hoist cylinder approaches its stroke end position (i.e., a position just before the vessel seating time on the vehicle body), a hoist valve is displaced to a snub position and a return oil from an expansion chamber of the hoist cylinder passes through an orifice of the hoist valve disposed to the snub position. According to such arrangement, the flow rate of the oil is restricted to thereby make slow the contraction speed of the hoist cylinder.

In another example of Japanese Patent Laid-open Publication No. 2000-87916, there is shown a device for reducing a shock at a cylinder stroke end position, in which there is arranged a cylinder for reducing a shock at a stroke end of the cylinder by throttling a return oil after the approaching to the contraction stroke end. In the use of such cylinder, an electromagnetic proportional pressure reducing valve is incorporated in a circuit connecting a directional control valve and a remote control valve so as to detect a signal representing an increasing of a load pressure due to the throttling of the return oil of the cylinder and, upon the detection of such signal, the electromagnetic proportional pressure reducing valve is current-conducted and controlled to thereby displace the directional control valve to a position near a neutral position to more reduce the shock at the cylinder stroke end position.

In the former prior art device, the return oil of the hoist cylinder passes through the orifice of the hoist valve displaced to the snub position, so that an amount of the oil passing through the orifice varies under influence of difference of viscosities at various oil temperatures. For this reason, the temperature of the return oil of the hoist valve differs at a time when an atmospheric temperature differs or a temperature at a working site differs, or at a time when a working condition differs such as a difference between at an early morning working time and at a time after long working period. Accordingly, in such time, the contraction speed of the hoist cylinder differs, and in such case, there may cause a case that the seating shock cannot be reduced.

In the latter prior art device, on the other hand, it becomes necessary to use a cylinder having a complicated structure for throttling the return oil after the approaching to the stroke end position, so that an expensive cylinder is required and an entire device becomes also expensive.

SUMMARY OF THE INVENTION

An object of the present invention is therefore to substantially eliminate defects or drawbacks encountered in the prior art mentioned above and to provide a system for controlling an operation of a cylinder capable of reducing a shock to a driven member such as vessel in a dump truck at its descending stroke ends.

This and other objects can be achieved according to the present invention by providing a system for controlling an operation of a cylinder comprising:

a cylinder displacing a member to be driven in a vertical direction;

a directional control valve being switched so as to take a first position performing an expansion motion of the cylinder and a second position performing a contraction motion of the cylinder;

a throttling means for throttling a meter-out area at a time when the directional control valve takes the second position;

means for outputting a signal in response to the vertical displacement of the driven member; and a controller, the controller being provided with a function for detecting a vertical position and a descending speed of the driven member in accordance with the signal from the signal outputting means, a function for controlling the throttling means at a time just before the driven member reaches a descending end position so as to make meter-out area to an optimum throttling value at which a descending shock is small, and function for detecting a descending speed of the driven member in a time interval from the position just before the descending end to the descending end position and amending and controlling the meter-out area by controlling the throttling means in accordance with the detected descending speed so as to make coincident the descending speed with the set descending speed.

According to the structure of the above aspect, when the driven member is descended at a position just before the descending end, the meter-out area of the directional control valve is throttled and the flow rate of the return oil from the cylinder is reduced to thereby make slow the contraction speed of the cylinder.

When the driven member is further descended from the position just before the descending end, the aforementioned meter-out area is amended and controlled in accordance with the descending speed and then descended to the descending end position at the set descending speed.

Therefore, in a case where the descending speed of the driven member becomes fast or slow according to the difference in the viscosity of the oil in different temperatures, the meter-out area of the directional control valve changes, and hence, the driven member is descended to the descending end position at the set descending speed.

Accordingly, the shock of the driven member at the descending end position can be reduced in an occasion of different working temperatures such as in the presence of an atmospheric temperature difference or temperature difference in the working sites, or in an occasion of different working or operating conditions such as in an early morning operation time or in a long time working.

Furthermore, according to the present invention, since the vertical position and the descending speed of the driven member can be detected in accordance with the output signal from the signal outputting means, a cheap cylinder of usual type can be utilized, and hence, the entire device can be manufactured with reduced cost.

Still furthermore, since the meter-out area is controlled at a portion between the position just before the descending end and the descending end position, the controlling time can be converged within a constant range, so that there is less influenced by differences in the meter-out area due to the weight of the driven member or the working error of the directional control valve, in comparison with the case where the vertical movement of the driven member is controlled over the entire stroke range, thus surely reducing the shock at the descending end position of the driven member.

Furthermore, in the structure of the present invention mentioned above, the controller is further provided with a learning function for amending an optimum throttling valve of a next meter-out area to be small at a time when the descending time of the driven member from the position just before the descending end to the descending end position is longer than the optimum time, and on the contrary, for amending the optimum throttling valve of the next meter-out area to be large at a time ho when the descending time of the driven member from the position just before the descending end to the descending end position is shorter than the optimum time.

According to this structure, at a time when the descending time of the driven member from the position just before the descending end to the descending end position is different from the optimum time (i.e., the driven member is not descended at the set descending speed), the next optimum meter-out area is changed in accordance with the actual descending time, so that the driven member can be descended at the optimum time in the next descending operation.

Furthermore, in the present invention, the directional control valve is a pilot pressure change-over valve to be changed over by a pilot pressure, the throttling means is an electromagnetic proportional pressure control valve for controlling the pilot pressure, and the controller controls the meter-out area of the directional control valve by controlling a current conducted to a solenoid of the electromagnetic proportional pressure control valve.

According to this structure, the expansion and contraction operations of the driven member can be controlled by using the directional control valve of a usual pilot pressure change-over valve type and the electromagnetic proportional pressure control valve. Moreover, at this time, the controller merely controls the current conduction to the solenoid, so that this controlling can be easily done.

The nature and further characteristic features of the present invention will be made more clear from the following descriptions made with reference to the accompanying drawings.

DESCRIPTION OF THE PREFERRED EMBODIMENT

One preferred embodiment of the present invention will be described hereunder with reference to FIGS. 1 to 3. Further, it is to be noted that terms representing positions, attitudes or like of various members, portions or like such as "vertical", "upper", "lower", "front", "rear", "longitudinal" and the like are used herein in a normal state of a vehicle shown in FIG. 1.

Figure 1:
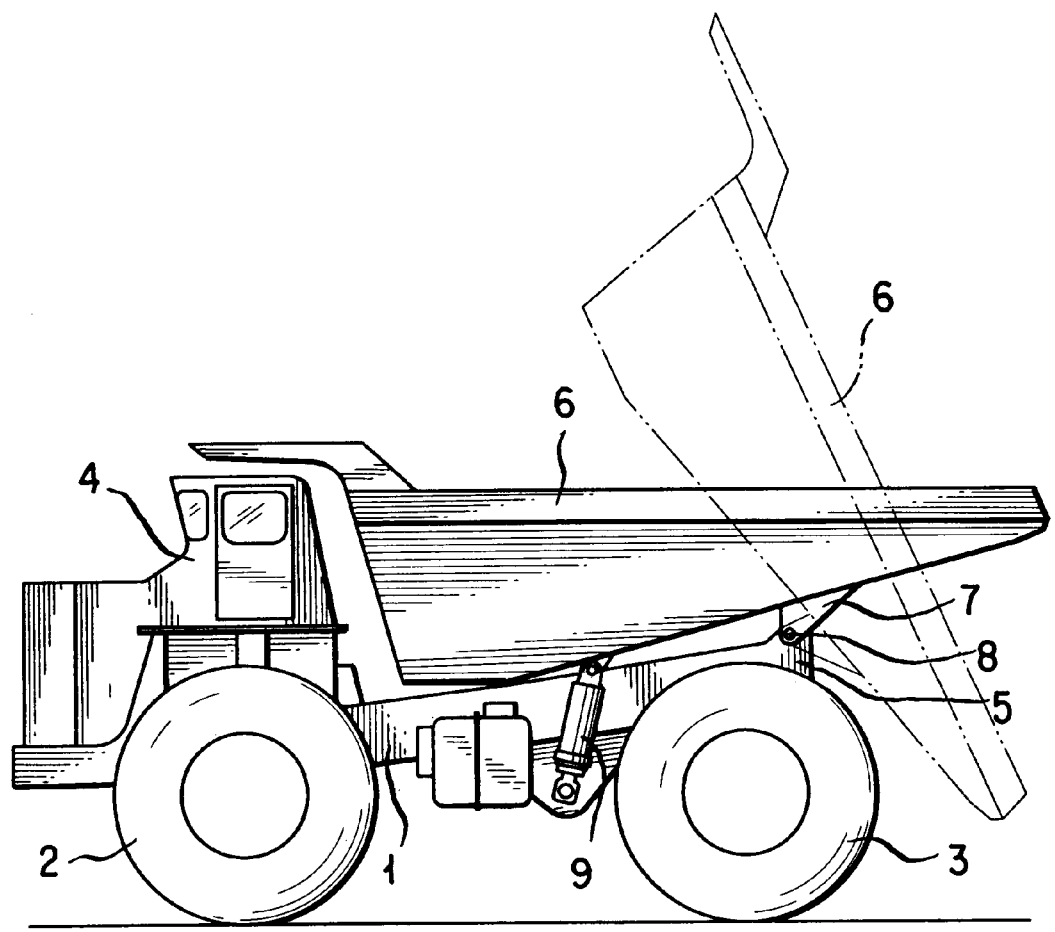
FIG. 1 is a side view of a dump truck to which a system for controlling an operation of a cylinder of the present invention is applicable.

First, referring to FIG. 1, a vehicle, i.e. a dump truck is shown, and the vehicle has a vehicle body 1 to which front wheels 2 and rear wheels 3 are mounted.

An operator's cab 4 is arranged to a front side portion of the vehicle body 1, and a lateral pair of vessel mounting brackets 5 are mounted to a rear side portion of the vehicle body 1.

A lateral pair of brackets 7 are also mounted to a bottom surface of the rear side portion of a vessel (i.e., road carrying platform) 6. These brackets 7 and the above-mentioned vessel mounting brackets 5 are coupled to each other by means of transverse shaft 8, and the vessel 6 is mounted to a vehicle body 1 to be vertically swingable.

A lateral pair of hoist cylinders 9 are disposed between longitudinally intermediate portions of the vehicle body 1 and longitudinally intermediate bottom portions of the vessel 6, respectively.

When the hoist cylinders 9 are operated to be contracted, the vessel 6 is swung vertically downward so as to take a solid line position in FIG. 1, at which the vessel 6 is seated (settled) in the vessel settling attitude, i.e., in a tilt-down state on a vessel carrying platform.

On the contrary, when the hoist cylinders 9 are operated to be expanded, the vessel 6 is swung upward so as to take a standing position (sediment discharging attitude) as shown with an image line in FIG. 1.

Figure 2:
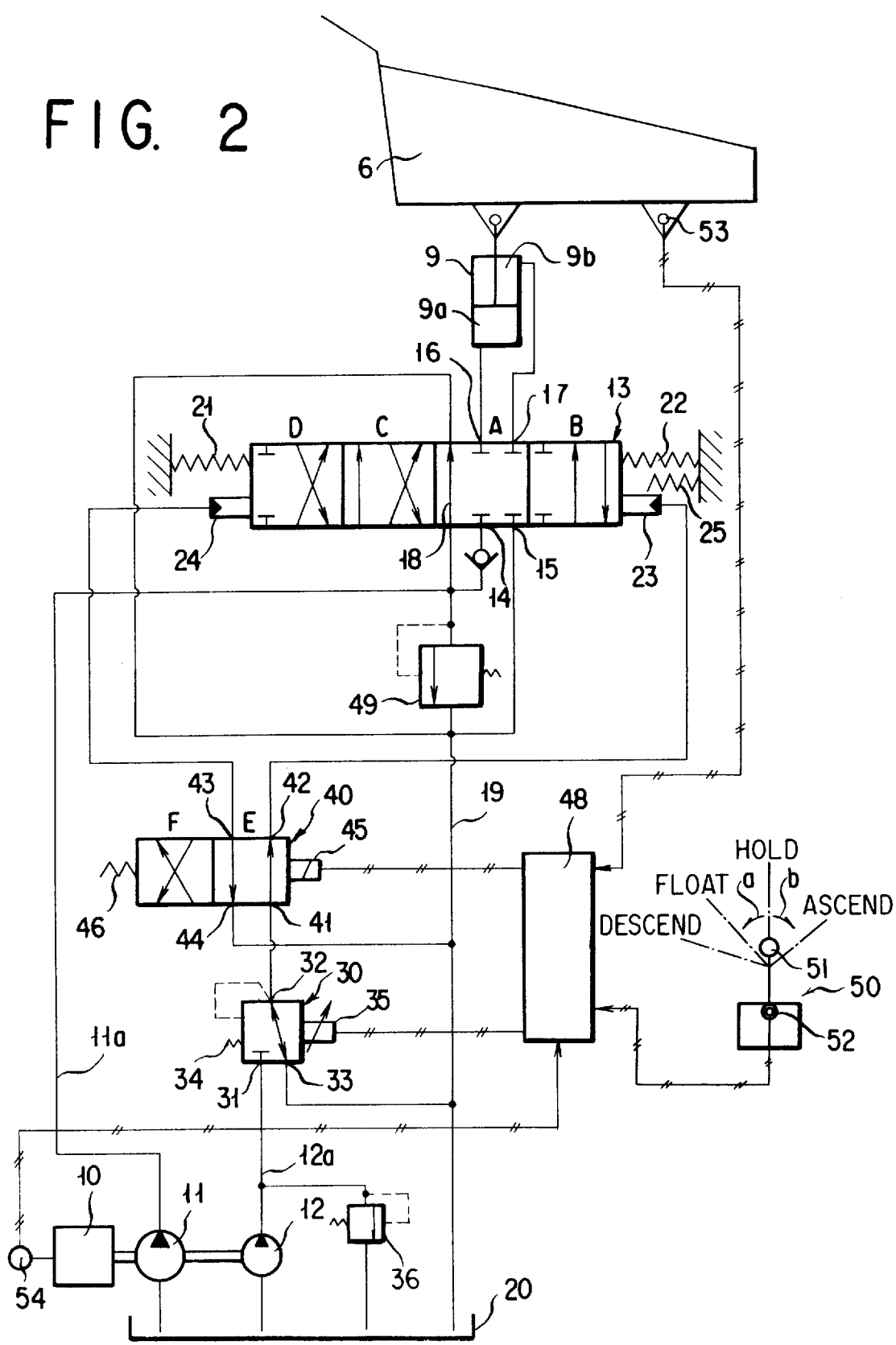
FIG. 2 is a hydraulic circuit diagram for supplying a pressurized, i.e., hydraulic, oil to a hoist cylinder of the dump truck.

With reference to FIG. 2, a hydraulic pump 11 and an auxiliary hydraulic pump 12 are driven by an operation of an engine 10. The hydraulic pump 11 has a discharge passage 11a into which a directional control valve such as hoist valve 13 is incorporated.

The hoist valve 13 is provided with a pump port 14, a tank port 15, a first actuator port 16, a second actuator port 17 and a by-pass passage 18, and is switched to take any one of positions of hold position A, ascending or move-up position B, float position C and descending or move-down position D.

The discharge passage 11a is communicated with the pump port 14 and the inlet side of the by-pass passage 18, and the outlet side of the by-pass passage 18 and the tank port 15 are communicated with a drain passage 19 which is connected to a tank 20. The first actuator port 16 is communicated with an expansion chamber 9a of the hoist cylinder 9 and the second actuator port 17 is communicated with a contraction chamber 9b of the hoist cylinder 9.

The hoist valve 13 takes the hold position A by means of first and second springs 21 and 22.

In the hold position A of the hoist valve 13, the communication to the pump port 14, the tank port 15, the first actuator ports 16 and the second actuator port 17 are interrupted respectively, and the communication to the bypass passage 18 is established.

Accordingly, the operation of the hoist cylinder 9 stops. At this time, the discharged oil from the hydraulic pump 11 passes through the by-pass passage 18 and then flows out into the tank 20 through the drain passage 19.

The hoist valve 13 is displaced toward the ascending position B, against the force of the first spring 21, depending on a pressure of a pilot hydraulic oil supplied to a first pressure receiving portion 23 and to take the ascending position B when this hydraulic oil pressure coincides with a first set pressure.

In the state of the ascending position B of the hoist cylinder 13, the pump port 14 and the first actuator port 16 are communicated with each other, the second actuator port 17 and the tank port 15 are communicated with each other, and the by-pass passage 18 is closed.

According to this manner, the discharged hydraulic oil from the hydraulic pump 11 is supplied to the expansion chamber 9a of the hoist cylinder 9, and on the other hand, the hydraulic oil in the contraction chamber 9b of the hoist cylinder 9 is drained into the tank 20. Thus, the hoist cylinder 9 performs the expansion motion.

The hoist valve 13 is displaced to the float position C, against the force of the second spring 22, depending on a pressure of a pilot hydraulic oil supplied to a second pressure receiving portion 24 and to take the float position C when this hydraulic oil pressure coincides with a second set pressure.

In the state of the float position C of the hoist cylinder 13, the pump port 14 is communicated with the second actuator port 17, the tank port 15 is communicated with the first actuator port 16, and the communication to the by-pass passage 18 is established.

According to this manner, the discharged hydraulic oil from the hydraulic pump 11 is supplied to the contraction chamber 9b of the hoist cylinder 9 and flows to the tank 20. The hydraulic oil in the expansion chamber 9a flows also in the tank 20. Thus, the hoist cylinder 9 is contracted by a self-weight of the vessel 6, which is then seated on the vehicle body 1 to thereby take the tilt-down or descending end state. Further, it may be possible, at the float position C of the hoist valve 13, to establish the communications between the pump port 14 and the tank port 15 and between the first actuator port 16 and the second actuator port 17 and also establish the communication of the by-pass passage 18.

According to such arrangement, the hoist cylinder 9 can be freely expanded or contracted by an external force. For example, when an external force in a direction to expand the cylinder 9 is applied to the hoist cylinder 9, the hoist cylinder 9 is operated to be expanded and, on the other hand, when an external force in a direction to contract the cylinder 9 is applied to the hoist cylinder 9, the hoist cylinder 9 is operated to be contracted.

When the hoist valve is displaced to the float position C, a third spring 25 acts.

In the float position C of the hoist valve 13, when the pressure of the second pressure receiving portion 24 becomes higher than the second set pressure by a predetermined amount of pressure, the hoist valve 13 is moved to the descending position D, depending on this pressure, against the forces of the second and third springs 22 and 25, and when this pressure exceeds a third set pressure, the hoist valve 13 takes its descending position D.

In the descending end state of the hoist valve 13, the pump port 14 is communicated with the second actuator port 17, the first actuator port 16 is communicated with the tank port 15, and the by-pass passage 18 is closed.

According to this manner, the hydraulic oil discharged from the hydraulic pump 11 is supplied to the contraction chamber 9b of the hoist cylinder 9, and on the other hand, the hydraulic oil in the expansion chamber 9a of the hoist cylinder 9 is drained into the tank 20. Thus, the hoist cylinder 9 performs the contraction stroke.

That is, the hoist valve 13 has a structure of pilot pressure switching type taking first and second position; i.e., in the first position, the hoist cylinder 9 carries out the expansion motion by the pilot hydraulic oil supplied to the first pressure receiving portion 23, and in the second position, the hoist cylinder 9 carry out the contraction motion by the pilot hydraulic oil supplied to the second pressure receiving portion 24, and the flow rate, i.e., mater-out area, of the return oil from the hoist cylinder 9 is varied by the pressure of this pilot hydraulic oil.

Further, an electromagnetic proportional pressure control valve 30 is provided for the discharge passage 12a of the auxiliary hydraulic pump 12.

The electromagnetic proportional control valve 30 is provided with an inlet port 31, an outlet port 32 and a tank port 33. The electromagnetic proportional pressure control valve 30 is maintained to a first position at which communication between the inlet port 31 and outlet port 32 is interrupted by a pressure (output pressure) at the outlet port 32 and a spring 34, and the outlet port 32 and the tank port 33 are communicated with each other.

A solenoid 35 is provided for the electromagnetic proportional pressure control valve 30, which, according to a thrust force of this solenoid 35, is then displaced to a second position at which the inlet port 31 and the outlet port 32 are communicated with each other and the communication between the outlet port 32 and the tank port 33 is interrupted.

As described above, the electromagnetic proportional control valve 30 takes its first position at a time of no "0" current conduction of the solenoid 35, at which the pressure at the outlet port becomes zero "0" (i.e., equal to the tank pressure), and the pressure at the inlet port 31 becomes equal to a relief set pressure of an auxiliary relief valve 36 disposed to the drain passage 12a of the auxiliary hydraulic pump 12.

Further, the pressure at the output port 32 becomes increased in proportion to the current conduction of the solenoid 35.

In other words, it may be said that the electromagnetic proportional control valve 30 is a means for throttling the meter-out area of the hoist valve 13 by controlling the pressure of the pilot hydraulic oil, which will be mentioned hereinlater.

The output hydraulic oil from the electromagnetic proportional pressure control valve 30 is supplied to either the first pressure receiving portion 23 or the second pressure receiving portion 24 of the hoist valve 13 through an operation of an electromagnetic change-over (directional control) valve 40. The electromagnetic directional control valve 40 is provided with a first port 41 communicated with the outlet port 32, a second port 42 communicated with the first pressure receiving portion 23, a third port 43 communicated with the second pressure receiving portion 24 and a fourth port 44 communicated with the tank 20. Further, this electromagnetic directional control valve 40 is displaced to a first position E by a thrust (force) of a solenoid 45 and displaced to a second position F by means of spring 46.

At the first position E of the electromagnetic directional control valve 40, the first port 41 and the second port 42 are communicated with each other, and the third port 43 and the fourth port 44 are also communicated with each other.

According to the arrangement mentioned above, the hydraulic oil is supplied to the first pressure receiving portion 23 of the hoist valve 13 and the hydraulic oil in the second pressure receiving portion 24 is drained into the tank 20.

At the second position F of the electromagnetic directional control valve 40, the first port 41 and the third port 43 are communicated with each other and the second port 42 and the fourth port 44 are also communicated with each other.

According to the arrangement mentioned above, the hydraulic oil is supplied to the second pressure receiving portion 24 of the hoist valve 13 and the hydraulic oil in the first pressure receiving portion 23 is drained into the tank 20.

That is, it will be said that the electromagnetic directional control valve 40 is a pilot pressure supply control valve which changes the supply of the pilot hydraulic oil to switch the hoist valve 13.

The solenoid 35 of the electromagnetic proportional pressure control valve 30 and the solenoid 45 of the electromagnetic directional control valve 40 are controlled by means of currents from a controller 48, into which a signal for switching a hold-signal, a ascending-signal, a float-signal or a descending-signal from an electric lever device 50 is inputted.

Further, a relief valve 49 is provided for the discharge passage 11a of the hydraulic pump 11 as shown in FIG. 2.

The electric lever device 50 is provided with a lever (member) 51 pivotal in arrow-head directions a and b, a potentiometer 52 for generating an electric signal proportional to a pivotal stroke of the lever 51 and an electrical or mechanical detent member, not shown, for holding the lever 51 to the float position or ascending position.

When the lever 51 is pivoted in the arrow-head direction a, the float position or descending position is selected, and a signal representing that the potentiometer 52 is pivoted in the direction of the arrow a and a signal in proportion to the pivotal stroke are generated to the controller 48.

On the other hand, when the lever 51 is pivoted in the arrow-head direction b, the ascending position is selected, and a signal representing the fact that the potentiometer 52 is pivoted in the direction of the arrow b and a signal in proportion to the pivotal stroke are generated to the controller 48.

There is also provided a signal output means for outputting a signal in response to a vertical swinging movement of the vessel 6, for example, a potentiometer 53, to a shaft 8 coupling the vehicle body 1 and the vessel 6. The output signal from the potentiometer 53 is inputted into the controller 48.

Rotation speed (revolution number) of the engine 10 is detected by an engine rotation sensor 54, and the detected engine rotation speed is inputted into the controller 48.

The controller 48 generates a current in accordance with an electric signal in proportional to the lever operation stroke to the solenoid 35 of the electromagnetic pressure control valve 30. Further, no current conduction to the solenoid 35 is established at the hold-position of the lever 51.

The controller 48 generates a current conduction to the solenoid 45 of the electromagnetic directional control valve 40 in response to the signal showing the pivotal movement in the direction of the arrow b of the lever 51, and at the other time, current is not conducted to the solenoid 45.

The controller 48 always calculates and detects the position and the descending speed of the vessel 6 in accordance with the signals from the potentiometer 53.

The operation for swinging the vessel 6 from the standing attitude to the tilt-down attitude will be described hereunder.

First, the lever 51 of the electric lever device 50 is operated to take the float position. In this instance, the controller 48 generates current of a value in proportion to the lever operation amount to the solenoid 35 of the electromagnetic proportional pressure control valve 30, which then outputs a pressure in proportion to the lever operation amount.

On the other hand, the current is not conducted to the solenoid 45 of the electromagnetic directional control valve 40, which, accordingly, takes the second position F.

According to such operation, a pilot hydraulic oil having a pressure in proportion to the lever operation amount is supplied to the second pressure receiving portion 24 of the hoist valve 13, which then takes the float position C.

In this instance, the discharged hydraulic oil from the hydraulic pump 11 is supplied to the contraction chamber 9b of the hoist cylinder 9, the hydraulic oil in the expansion chamber 9a is flown out to the tank 20 through the first actuator port 16 and the tank port 15 (meter-out state), and the hoist cylinder 9 is contracted to thereby swing and move the vessel downward.

Figure 3:
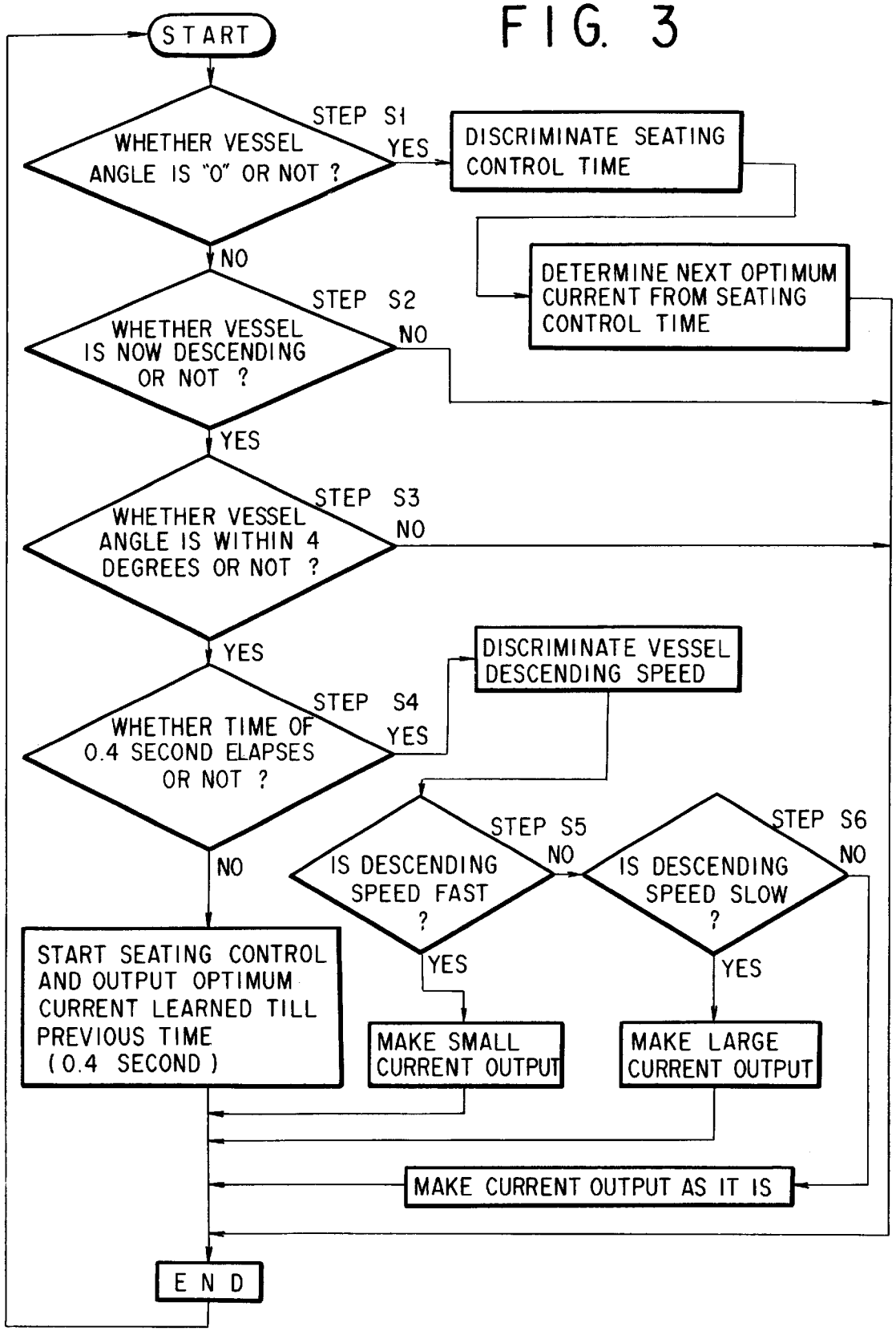
FIG. 3 is a flowchart showing a vessel tilting-down speed control according to the present invention.

During the downward movement of the vessel 6, the controller 48 operates in the following manner, which is represented by the flowchart of FIG. 3.

With reference to FIG. 3, first, in step S1, it is judged whether a vessel angle is zero "0" or not. For example, it is provided that the vessel angle is judged as "0" degree at a time when the output signal from the potentiometer 53 is equal to a first set angle and judged as not "0" degree (angle other than "0" degree) at a time when the output signal therefrom differs from the first set angle.

This first set angle is an actually measured value at a time when the vessel 6 is preliminarily swung in the vertical direction or a calculated value based on a dimension of each element or member.

During the vessel descending operation, the vessel angle is not "0" degree, so that the operation advances to step S2.

In step S2, it is discriminated whether the vessel is now moving down or not. For example, it is provided that the vessel angle is judged to be now in the move-down state at a time when the output signal from the potentiometer 53 varies and judged not to be now in the descending state at a time when the output signal therefrom does not vary.

Then, operation step advances to step S3 at a time when the vessel is being moved downward.

In step S3, it is discriminated whether the vessel angle is within a preliminarily set second set angle (for example, 4 degrees). That is, it is discriminated whether or not the vessel 6 enters a seating shock prevention region just before the seating position.

Operation step advances to step S4 at a time when the vessel angle is within the second set angle.

In step S4, when the vessel angle accords with the second set angle, seating control operation starts and the optimum current learned in the previous process, described hereinlater, is outputted for a predetermined set time (for example, 0.4 sec.).

This optimum current is smaller than current value in proportion to the lever operation amount mentioned before, and the output pressure of the electromagnetic proportional pressure control valve 30 becomes low pressure, so that the pilot hydraulic oil pressure to be supplied to the second pressure receiving portion 24 of the hoist valve 13 also becomes low pressure. The hoist valve 13 moves on to the side of the hold position A further from the float position C, and the communication area between the pump port 14 and the second actuator port 17 and the communication area between the first actuator port 16 and the tank port 15 are made smaller (i.e., the meter-out area is throttled). Therefore, the flow rate of the hydraulic oil drained from the expansion chamber 9a of the hoist cylinder 9 to the tank 20 (i.e., flow rate of the return oil) is reduced.

Thus, the contraction speed of the hoist cylinder 9 is made slow, and hence, the lowering speed of the vessel 6 is also made slow.

In other words, the controller 48 generates the optimum current, whereby the electromagnetic proportional pressure control valve 30 (throttling means) is controlled and the meter-out area of the hoist valve 13 is made to the optimum throttled value at which the seating shock is made small.

The current conduction amount to the solenoid 35 of the electromagnetic proportional pressure control valve 30 is reduced to the optimum value from the value in conformity with the operation stroke of the operation lever.

Accordingly, the output pressure of the electromagnetic proportional pressure control valve 30 is gradually reduced, and hence, the meter-out area of the hoist valve 13 can be continuously slowly throttled. Thus, the contraction speed of the hoist cylinder 13 is smoothly reduced, so that any shock will not occur at the seating control starting period.

The vessel descending or lowering speed is discriminated after the lapse of the aforementioned set time period. This vessel descending speed discrimination will be performed in the following manner.

The vessel descending speed is calculated in accordance with the output signal from the potentiometer 53.

In step S5, the set descending speed and the actual descending speed are compared. In the case where the actual descending speed is faster than the set descending speed, the output of the current mentioned before is made small, whereby the output pressure from the electromagnetic proportional pressure control valve 30 is made low, the hoist valve 13 is displaced further to the hold position A more than in the aforementioned position, and the meter-out area is made further small, so that the descending speed becomes slow.

Operation step advances to step S6 in the case where the actual descending speed is not faster than the set descending speed.

In step S6, the set descending speed and the actual descending speed are compared. In the case where the actual descending speed is slower than the set descending speed, the output of the current mentioned before is made large, whereby the output pressure from the electromagnetic proportional pressure control valve 30 is made high, the hoist valve 13 is displaced further to the float position C more than in the aforementioned position, and the meter-out area is made further large, so that the descending speed becomes fast. In the case that the actual descending speed is not slow, the aforementioned output current is kept as it is.

That is, after the passing of the set time period from the starting of the seating control operation, the vessel descending speed is fedback to thereby continuously change the meter-out area, thus andante making slow the vessel descending speed (making speed down).

Upon the seating of the vessel on the vehicle body 1, the vessel angle is discriminated as "0" angle in step S1 and the seating control time is calculated and then discriminated.

The seating control time is a time between which the vessel angle varies from the second set angle to the "0" angle (i.e., the time just before the seating time to the seated-on time), and if this time is longer than the aforementioned optimum time, it is discriminated that the seating shock is smaller than admissible value but it takes much time for the seating of the vessel on the vehicle body, and on the contrary, if this time is shorter than the aforementioned optimum time, the seating shock is larger than the admissible value.

Based on the seating control time mentioned above, the former optimum current is amended and the next optimum current (i.e., the optimum current which has been learned in the time up to the former operation outputted in step S4) is determined.

For example, in the case where the seating control time is longer than the optimum time (i.e., the descending speed is slow), the former optimum current is made larger by an amount corresponding to this longer time period. On the contrary, in the case where the seating control time is shorter than the optimum time (i.e., the descending speed is fast), the former optimum current is made smaller by an amount corresponding to this shorter time period.

In the described embodiment, the output hydraulic oil of one electromagnetic proportional pressure control valve 30 is supplied, through the switching operation, to one of the first and second pressure receiving portions 23 and 24 of the hoist valve 13 by means of the electromagnetic directional control valve 40. However, it may be possible to supply output pressures of two electromagnetic proportional pressure control valves 30 to the first pressure receiving portion 23 and the second pressure receiving portion 24 of the hoist valve 13.

Furthermore, in the described embodiment, the present invention is applied to the hoist cylinder of the dump truck, but it is applicable to the arm cylinder for vertically swinging an arm of an excavation loader, and in such case, the directional control valve may not be provided with a float position. That is, a driven member may be descended through the contraction motion of a cylinder which displaces the driven member in the vertical direction. In such case, the vessel, the seat, the time just before the seating and the seating shock may be substituted with the driven member, the descending end, the time just before the descending and the descending end shock, respectively.

It is further noted that, although the present invention is disclosed as an invention which is applicable to the cylinder operation control device, the present invention is not limited to such specific embodiment or application, and many other applications will be suggested for those skilled in the art. Furthermore, it will be caused for experts in this art field to make various amendments, modifications and changes in the details of the illustrated and described embodiments so as to be conformed with design or like or with the necessity of the applications. Accordingly, it is reasonable that the present invention is understood by a method coincident with correct meaning or proper aspect of broader scopes of the appended claims.

What is claimed is:

1. A system for controlling an operation of a cylinder comprising:

a cylinder displacing a member to be driven in a vertical direction;

a directional control valve which is switchable so as to take a first position performing an expansion motion of the cylinder and a second position performing a contraction motion of the cylinder;

throttling means for throttling a meter-out area at a time when the directional control valve takes said second position;

means for outputting a signal in response to the vertical displacement of said driven member; and a controller, said controller being provided with a function for detecting a vertical position and a descending speed of the driven member in accordance with the signal from the signal outputting means, a function for controlling the throttling means at a time just before the driven member reaches a descending end position so as to make the meter-out area to an optimum throttling value at which a descending shock is small, and a function for detecting a descending speed of the driven member in a time interval from the position just before the descending end to the descending end position and amending and controlling the meter-out area by controlling the throttling means in accordance with the detected descending speed so as to make coincident the descending speed with a set descending speed.

2. A system for controlling an operation of a cylinder according to claim 1, wherein said controller is further provided with a learning function for amending an optimum throttling value of a next meter-out area to be small at a time when the descending time of the driven member from the position just before the descending end to the descending end position is longer than an optimum time, and for amending the optimum throttling value of the next meter-out area to be large at a time when the descending time of the driven member from the position just before the descending end to the descending end position is shorter than the optimum time.

3. A system for controlling an operation of a cylinder according to claim 1, wherein:

said directional control valve comprises a pilot pressure change-over valve to be changed over by a pilot pressure, said throttling means comprises an electromagnetic proportional pressure control valve for controlling the pilot pressure, and said controller controls the meter-out area of the directional control valve by controlling a current conducted to a solenoid of the electromagnetic proportional pressure control valve.

4. A system for controlling an operation of a cylinder according to claim 2, wherein:

said directional control valve comprises a pilot pressure change-over valve to be changed over by a pilot pressure, said throttling means comprises an electromagnetic proportional pressure control valve for controlling the pilot pressure, and said controller controls the meter-out area of the directional control valve by controlling a current conducted to a solenoid of the electromagnetic proportional pressure control valve.

* * * * *